(12) United States Patent
Lee

(10) Patent No.: US 9,866,506 B2
(45) Date of Patent: Jan. 9, 2018

(54) METHOD OF CONTROLLING GROUP CHATTING IN PORTABLE DEVICE AND PORTABLE DEVICE PERFORMING THE SAME

(71) Applicant: Samsung Electronics Co., Ltd., Suwon-si, Gyeonggi-do (KR)

(72) Inventor: Eunyeung Lee, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 847 days.

(21) Appl. No.: 14/294,393

(22) Filed: Jun. 3, 2014

(65) Prior Publication Data

US 2014/0359487 A1    Dec. 4, 2014

(30) Foreign Application Priority Data

Jun. 4, 2013    (KR) ........................ 10-2013-0064199

(51) Int. Cl.
*G06F 3/048*    (2013.01)
*H04L 12/58*    (2006.01)
*G06Q 10/10*    (2012.01)
*H04L 12/18*    (2006.01)

(52) U.S. Cl.
CPC ......... *H04L 51/046* (2013.01); *G06Q 10/101* (2013.01); *G06Q 10/107* (2013.01); *H04L 12/1831* (2013.01)

(58) Field of Classification Search
CPC .................. G06F 17/30528; G06F 3/0482
See application file for complete search history.

(56) References Cited

U.S. PATENT DOCUMENTS

| 8,756,646 | B2* | 6/2014 | LaFreniere | H04N 7/17327 |
| | | | | 725/110 |
| 8,881,027 | B1* | 11/2014 | Brown | H04M 3/56 |
| | | | | 715/751 |
| 8,997,006 | B2* | 3/2015 | Whitnah | H04L 51/32 |
| | | | | 715/203 |
| 2006/0133585 | A1* | 6/2006 | Daigle | G06F 17/275 |
| | | | | 379/88.06 |
| 2010/0005402 | A1* | 1/2010 | George | H04L 51/04 |
| | | | | 715/758 |
| 2010/0175003 | A1* | 7/2010 | Castellucci | G06Q 10/107 |
| | | | | 715/758 |
| 2010/0223335 | A1* | 9/2010 | Fu | H04L 12/1818 |
| | | | | 709/205 |

(Continued)

FOREIGN PATENT DOCUMENTS

KR    10-2010-0054370 A    5/2010

*Primary Examiner* — William Bashore
*Assistant Examiner* — Rayeez Chowdhury
(74) *Attorney, Agent, or Firm* — Jefferson IP Law, LLP

(57)    ABSTRACT

A method of controlling group chatting in a portable device, and a portable device performing the same, which are capable of extracting and displaying a dialog of a certain conversation partner on a sub-chatting window are provided. The method includes detecting a request for an extraction of a dialog for at least one certain conversation partner from conversation partners in the group chat, extracting the dialog of the at least one certain conversation partner from one or more dialogs in the group chat, and displaying the extracted dialog on a sub-chatting window.

20 Claims, 14 Drawing Sheets

(56) References Cited

U.S. PATENT DOCUMENTS

2011/0265019 A1* 10/2011 Ecevit ............... A63F 13/63
715/757
2011/0296320 A1* 12/2011 Kwon ............... H04L 12/1822
715/758

* cited by examiner

METHOD OF CONTROLLING GROUP CHATTING IN PORTABLE DEVICE AND PORTABLE DEVICE PERFORMING THE SAME

CROSS-REFERENCE TO RELATED APPLICATION(S)

This application claims the benefit under 35 U.S.C. §119 (a) of a Korean patent application filed on Jun. 4, 2013 in the Korean Intellectual Property Office and assigned Serial number 10-2013-0064199, the entire disclosure of which is hereby incorporated by reference.

TECHNICAL FIELD

The present disclosure relates to a method of controlling group chatting in a portable device and a portable device performing the same. More particularly, the present disclosure relates to a method of controlling group chatting in a portable device and a portable device performing the same, which are capable of extracting and displaying a dialog of a certain conversation partner on a sub-chatting window.

BACKGROUND

With the appearance of a smart phone, a recent portable device has various and complicated functions. One of widely used functions is to perform a group chatting by several conversation partners.

In group chatting, identifying dialogs of a certain conversation partner is difficult in a conversation having many conversation partners participating in conversation and dialogs increase. For example, a user may have difficulty identifying a notice message of a certain conversation partner as many conversation partners participate in conversation and dialogs increase. In order for the user to identify the dialogs of the certain conversation partner, the user must scroll through all dialogs of other conversation partners which the user does not desire to move a screen until the dialogs which the user wants to see are displayed.

Accordingly, there is a need for a function of extracting and identifying only the dialogs of the certain conversation partner which the user desires during the group chatting.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of controlling group chatting in a portable device and a portable device performing the same, which are capable of extracting and displaying only a dialog of a certain conversation partner on a separate window during the group chatting.

In accordance with an aspect of the present disclosure, a method of controlling a group chat is provided. The method includes detecting a request for an extraction of a dialog for at least one certain conversation partner of conversation partners in the group chat, extracting a dialog of the at least one certain conversation partner from one or more dialogs in the group chat, and displaying the extracted dialog on a sub-chatting window.

In accordance with another aspect of the present disclosure, the detecting of the request for the extraction of the dialog includes selecting the certain conversation partner according to a user input.

In accordance with another aspect of the present disclosure, the sub-chatting window is displayed according to at least one effect of a pop-up, a screen division, and an overlay.

In accordance with another aspect of the present disclosure, the displaying of the extracted dialog on the sub-chatting window includes determining whether the sub-chatting window for the certain conversation partner exists, displaying the extracted dialog on the present sub-chatting window if the sub-chatting window for the certain conversation partner is determined to exist, and generating the sub-chatting window if the sub-chatting window for the certain conversation partner is determined not to exist.

In accordance with another aspect of the present disclosure, the displaying of the extracted dialog on the sub-chatting window includes generating a new group chat for the certain conversation partner and displaying the extracted dialog on a group chatting window for the group chat.

In accordance with another aspect of the present disclosure, the generating of the group chat includes determining whether a group chat for the certain conversation partner exists and generating the group chat for the certain conversation partner if the group chat is determined not to exist.

In accordance with another aspect of the present disclosure, the method may further include detecting a dialog transmission or reception event for the group chat, determining whether the event is generated by the certain conversation partner, and in response to the event being generated by the certain conversation partner, displaying a dialog which is transmitted or received by the event on the sub-chatting window.

In accordance with another aspect of the present disclosure, the method may further include selecting a certain conversation partner to be added if a request for an addition of the certain conversation partner, extracting a dialog of the certain conversation partner to be added, and displaying the extracted dialog of the certain conversation partner to be added on the sub-chatting window.

In accordance with another aspect of the present disclosure, the request for the addition of the certain conversation partner corresponds to an input of dragging and dropping the certain conversation partner to be added in the sub-chatting window.

In accordance with another aspect of the present disclosure, a portable device is provided. The portable device includes a communication unit configured to communicate at least one dialog for a group chat with a server, a display unit configured to display a group chatting window for the group chat, an input unit configured to detect a request for an extraction of a dialog for at least one certain conversation partner of conversation partners in the group chat, and a controller configured to extract the dialog of the at least one certain conversation partner from one or more dialogs if the request for the extraction of the dialog is detected through the input unit, and to control the display unit to display the extracted dialog on a sub-chatting window.

In accordance with another aspect of the present disclosure, the controller receives an input of selecting the certain conversation partner through the input unit.

In accordance with another aspect of the present disclosure, the controller controls the display unit to display the sub-chatting window according to at least one effect of a pop-up, a screen division, and an overlay.

In accordance with another aspect of the present disclosure, the controller determines whether the sub-chatting window for the certain conversation partner exists, controls the display unit to display the extracted dialog on the present sub-chatting window if the sub-chatting window for the certain conversation partner is determined to exist, and generates the sub-chatting window if the sub-chatting window for the certain conversation partner is not present.

In addition, the controller generates a new group chat for the certain conversation partner, and controls the display unit to display the extracted dialog on a group chatting window for the group chat.

In accordance with another aspect of the present disclosure, the controller determines whether the group chatting for the certain conversation partner is determined to exist, and generates the group chat for the certain conversation partner if the group chatting is determined not to exist.

In accordance with another aspect of the present disclosure, the controller determines whether the event is generated by the certain conversation partner if a dialog transmission or reception event for the group chatting is detected, and controls the display unit to display a transmitted or received dialog by the event in response to the event being generated by the certain conversation partner.

In accordance with another aspect of the present disclosure, the controller receives an input of adding a certain conversation partner through the input unit if a request for an addition of the certain conversation partner is detected through the input unit, extracts a dialog of the certain conversation partner to be added, and controls the display unit to display the extracted dialog of the certain conversation partner to be added on the sub-chatting window.

In accordance with another aspect of the present disclosure, the request for the addition of the certain conversation partner corresponds to an input of dragging and dropping the certain conversation partner to be added in the sub-chatting window.

In the method of controlling the group chatting in the portable device and the portable device performing the same according to the present disclosure, only the dialog of the certain conversation partner which the user wants are extracted and displayed, so that the user may easily identify the desired dialogs during the group chatting in which many conversation partners participate, and smoothly carry out the chatting along with the certain conversation partner.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
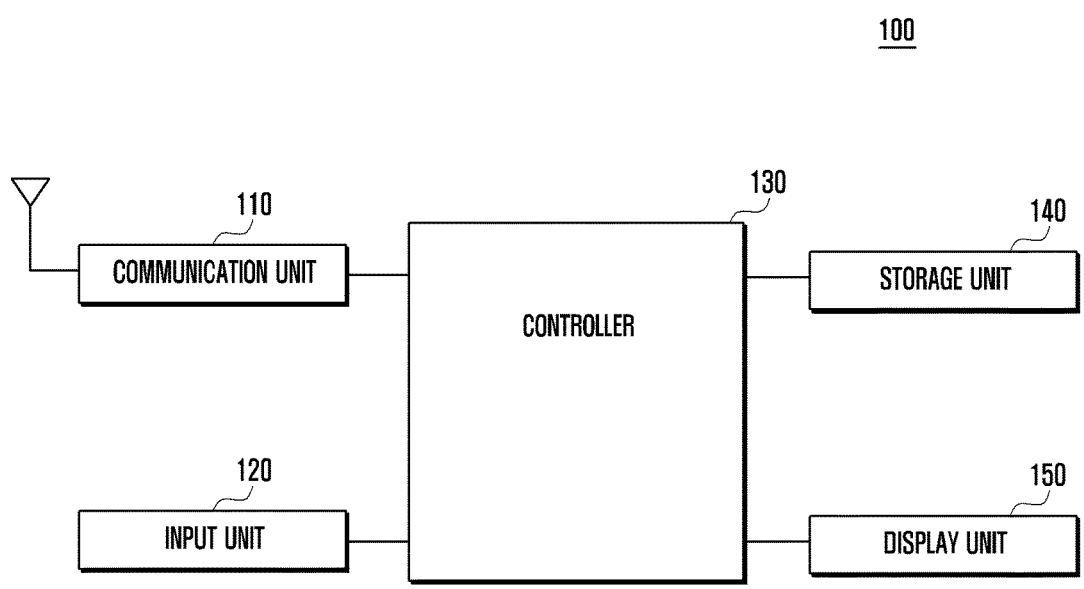
FIG. 1 is a block diagram illustrating a configuration of a portable device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure may be applied to control a portable device having a group chatting function. The portable device may be an electronic device.

Further, the present disclosure may be applied to all electronic devices having the group chatting function as well as a general electronic terminal such as a smart phone, a portable terminal, a mobile terminal, a mobile phone, a video phone, an e-book reader, a desktop Personal Computer (PC), a laptop PC, a netbook PC, a Personal Digital Assistant (PDA), a Portable Multimedia Player (PMP), a note pad, a WiBro terminal, a tablet PC, an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like, which has a group chatting function.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

It should be noted that the technical terms in the specification are merely used for describing a specific embodiment but do not limit the scope of the present disclosure. Further, the technical terms in the specification should be construed as a meaning generally understood by those skilled in the art unless the terms are defined as another meaning and should not be construed as an excessively inclusive meaning or an excessively exclusive meaning.

In addition, a singular expression used in the specification includes a plural expression as long as they are clearly distinguished in the context. Throughout the specification, the terms such as "comprise" or "include" should not be construed as necessarily including all of the various component or steps described in the specification.

Hereinafter, various embodiments of the present disclosure will be described in more detail with reference to the accompanying drawings.

FIG. 1 is a block diagram illustrating a configuration of a portable device according to an embodiment of the present disclosure.

Referring to FIG. 1, the portable device 100 includes a communication unit 110, an input unit 120, a controller 130, a storage unit 140, and a display unit 150.

The communication unit 110 performs data communication with an external device. The communication unit 110 may include a transmitter for up-converting and amplifying a frequency of a transmitted signal and a receiver for low-noise amplifying a received signal and down-converting a frequency of the received signal.

According to various embodiments of the present disclosure, the communication unit 110 may transmit a dialog input by a user for a group chatting to a group chatting server (and/or to a plurality of devices with which the portable terminal is in communication). Further, the communication unit 110 may receive a dialog input by a conversation partner for the group chatting from the group chatting server (and/or from a plurality of devices with which the portable terminal is in communication). In the case of transmitting and receiving the dialogs of the group chatting to/from the group chatting server, the communication unit 110 performs communication with the group chatting server by using a data packet including information on a user generating a dialog transmission and reception event, information on a time when a dialog is transmitted and received, and/or the like.

The input unit 120 detects an input of a user, and transmits an input signal corresponding to the user input to the controller 130. The input unit may include a button, a jog dial, a wheel, and/or the like, and may detect an input by a user's body, a pen, and/or the like through a touch sensor, an electromagnetic sensor, a proximity sensor, an Infrared (IR) sensor, a camera sensor, or the like.

The input unit 120 may include an input pad. The input unit 120 may be configured to have the input pad on which various sensors are mounted. The input unit 120 may be configured by an input pad onto which a touch sensor is attached in the form of a film or with which the touch sensor is combined in the form of a panel. Alternatively, the input unit 120 may include an Electro Magnetic Resonance (EMR) type input pad, an Electro Magnetic Interference (EMI) type input pad, and/or the like which uses an electromagnetic sensor. The input unit 120 may include one or more input pads formed in a layer structure to detect an input by using a plurality of sensors.

The input unit 120 may form a layer structure along with the display unit 150 to operate as an input screen. For example, the input unit 120 may be configured of a Touch Screen Panel (TSP) including an input pad having a touch sensor and connected with the display unit 150.

The input unit 120 may detect various inputs to perform chatting (e.g., inputs corresponding to characters and/or the like). For example, the input unit 120 may detect an input for performing a single chatting or a group chatting with a conversation partner that is capable of chatting. Further, the input unit 120 may detect an input for selecting a certain chatting group from a chatting list listing a plurality of chatting groups. When a chatting window for the selected chatting is displayed on the display unit 150 in response to a selection of the chatting, the input unit 120 detects an input of a dialog to be transmitted and an input for a transmission of the dialog within the chatting window. Further, the input unit 120 may detect an input for displaying information, a profile, a photograph, and/or the like of at least one conversation partner.

According to various embodiments of the present disclosure, the input unit 120 may detect a request for extracting a dialog of at least one user among the conversation partners participating in the group chatting. For example, the input unit 120 may detect the request for extracting the dialog of at least one user among the conversation partners participating in the group chatting through an input of displaying a menu indicating functions to be performed during the group chatting and the menu. The input unit 120 may detect an input for selecting a certain conversation partner of which a dialog is able to be extracted.

According to various embodiment of the present disclosure, the input unit 120 may detect an input of the user for adding, deleting, and editing the conversation partners in the group chatting. For example, the input unit 120 may detect an input of performing a drag and drop of a certain conversation partner to be added in the sub-chatting window. As another example, the input unit 120 may detect an input of performing a drag and drop of a certain conversation partner to be deleted from the sub-chatting window.

The controller 130 may control all structural elements for the general operation of the portable device 100. For example, the controller 130 may control all the structural elements to perform a group chatting function of the portable device 100.

According to various embodiments of the present disclosure, in response to receiving the request for the extraction of the dialog through the input unit 120, the controller 130 extracts the dialog of the certain conversation partner from one or more dialogs for the group chatting. Further, the controller 130 controls the display unit 150 to display the extracted dialog on the sub-chatting window. The controller 130 determines whether the sub-chatting window for the certain conversation partner is present, and if the sub-chatting window for the certain conversation partner is present, the controller 130 controls the display unit 150 to display the extracted dialog on the present sub-chatting window. In contrast, if the sub-chatting window for the certain conversation partner is not present, the controller 130 generates a sub-chatting window and controls the display unit 150 to display the extracted dialog on the generated sub-chatting window. The controller 130 generates a new group chatting for the certain conversation partner, and controls the display unit 150 to display the extracted dialog on the generated group chatting window.

According to various embodiments of the present disclosure, if the controller 130 detects a dialog transmission event or dialog reception event for the group chatting through the communication unit 110 or the input unit 120, the controller 130 determines whether the event is generated by the certain conversation partner. If the event is generated by the certain conversation partner, the controller 130 controls the display unit 150 to display the dialog transmitted or received through the event on the sub-chatting window.

According to various embodiments of the present disclosure, furthermore, when detecting an input of adding, deleting, or editing a certain conversation partner, the controller 130 may extract a dialog of a certain conversation partner to be added and control the display unit 150 to display the extracted dialog on the sub-chatting window, or may control the display unit 150 to delete the dialog of the certain user to be deleted from the sub-chatting window.

The more detailed operation of the controller 130 will be described in detail with reference to the drawings below.

The storage unit 140 may store a program or instructions for the portable device 100. The controller 130 may execute the program or the instructions stored in the storage unit 140.

The storage unit 140 may include at least one of a storage media such as, for example, a flash memory, a hard disk, a micro multimedia card, a memory card (e.g., an SD memory, an XD memory, and/or the like), a Random Access Memory (RAM), a Static RAM (SRAM), a Read-Only Memory (ROM), an Electrically Erasable Programmable ROM (EEPROM), a Programmable ROM (PROM), a magnetic memory, a magnetic disk, an optical disk, and/or the like.

According to various embodiments of the present disclosure, the storage unit 140 may store information on a chatting function. For example, the storage unit 140 may temporarily or permanently store dialog information including a list of conversation partners to perform the chatting, a list of a single chatting or group chatting, at least one dialog for the chatting, information on at least one conversation partner, and/or the like.

The display unit 150 displays (outputs) the information processed in the portable device 100. For example, the display unit 150 may display information corresponding to an application, a program or a service which is currently operated, along with a User Interface (UI), a Graphic User Interface (GUI), and/or the like.

The display unit 150 may include at least one of a Liquid Crystal Display (LCD) unit, a Thin Film Transistor-Liquid Crystal Display (TFT LCD) unit, an Organic Light-Emitting Diode (OLED) unit, a flexible display unit, and a three Dimensional (3D) display unit, and/or the like.

The display unit 150 may correspond to a mutual layer configuration along with a touch sensor, an electromagnetic sensor, and/or the like and operate as a touch screen. The display unit 150 operating as the touch screen may perform a function of an input unit.

According to various embodiments of the present disclosure, the display unit 150 may display a list of the conversation partners to participate in the chatting and a window for a single chatting or a group chatting corresponding to the single chatting or the group chatting, under a control of the controller 130. The display unit 150 may display information on a name, a nickname, a profile, an image, a status, and/or the like of the conversation partner, and dialog contents including a character, a symbol, an emoticon, and/or the like on the display window. The display unit 150 may display a menu used for controlling the chatting function on the chatting window.

According to various embodiments of the present disclosure, the display unit 150 may display the extracted dialog of the certain conversation partner on the sub-chatting window. The display unit 150 may display the sub-chatting window according to at least one effect of a pop-up effect, a screen division effect, and an overlay effect. Further, the display unit 150 may display the extracted dialog of the certain conversation partner on a separate chatting window generated by the controller 130.

The portable device 100 may be configured or otherwise implemented so as to have more than or fewer than the mentioned structural elements is possible.

Figure 2:
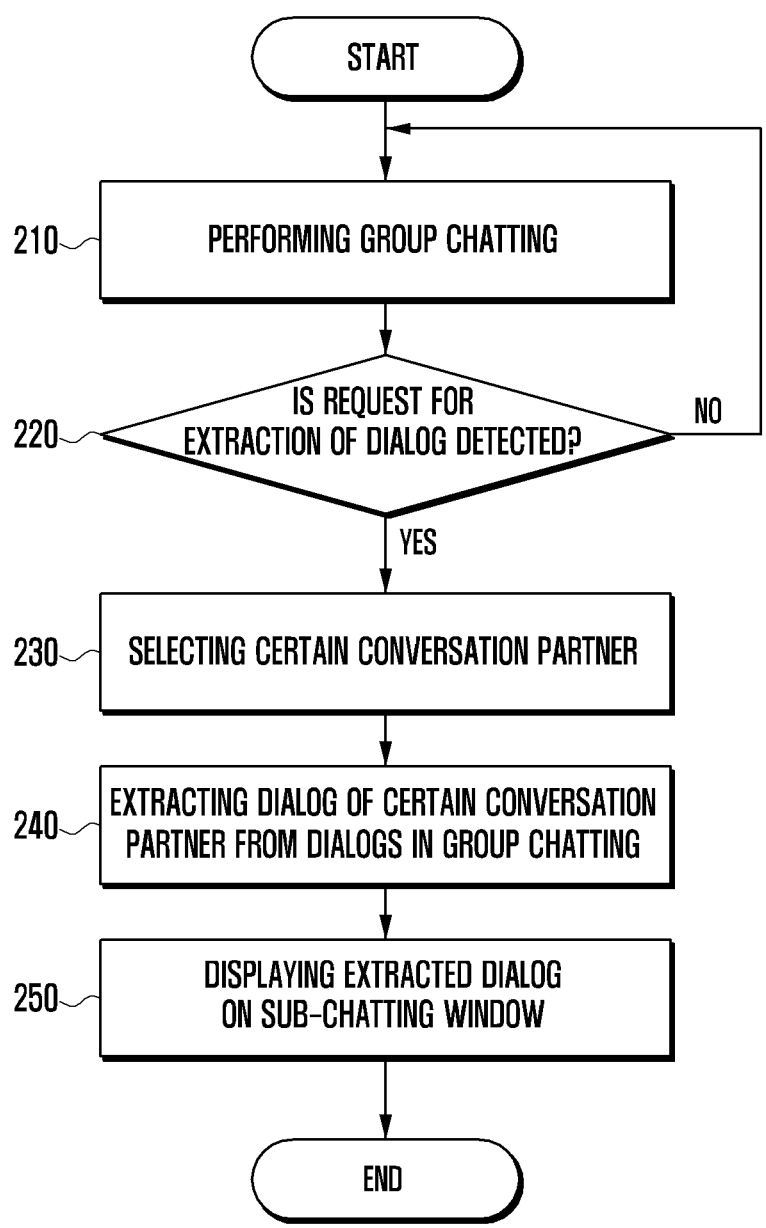
FIG. 2 is a flowchart illustrating a process of controlling group chatting according to an embodiment of the present disclosure.

FIG. 2 is a flowchart illustrating a process of controlling group chatting according to an embodiment of the present disclosure.

At operation 210, the controller 130 executes a group chatting.

The controller 130 may execute the group chatting e.g., when a request of a conversation partner is detected through the input unit 120, or when a dialog is received from the server through the communication unit 110. For example, in response to the controller 130 detecting a request to chat with a conversation partner, and/or in response to receiving a dialog, the controller 130 may execute the group chatting. The controller 130 may operate an application, a program, a service, and/or the like which supports the group chatting function to execute the group chatting. The controller 130 may control the display unit 150 to display a list of the conversation partners with whom the user has a conversation, or an existing chatting list in order to execute the group chatting.

If the controller 130 detects an input of generating a new group chatting or an input of selecting an already generated group chatting through the input unit 120, the controller 130 controls the display unit 150 to display a group chatting window for a corresponding group chatting.

Figure 3:
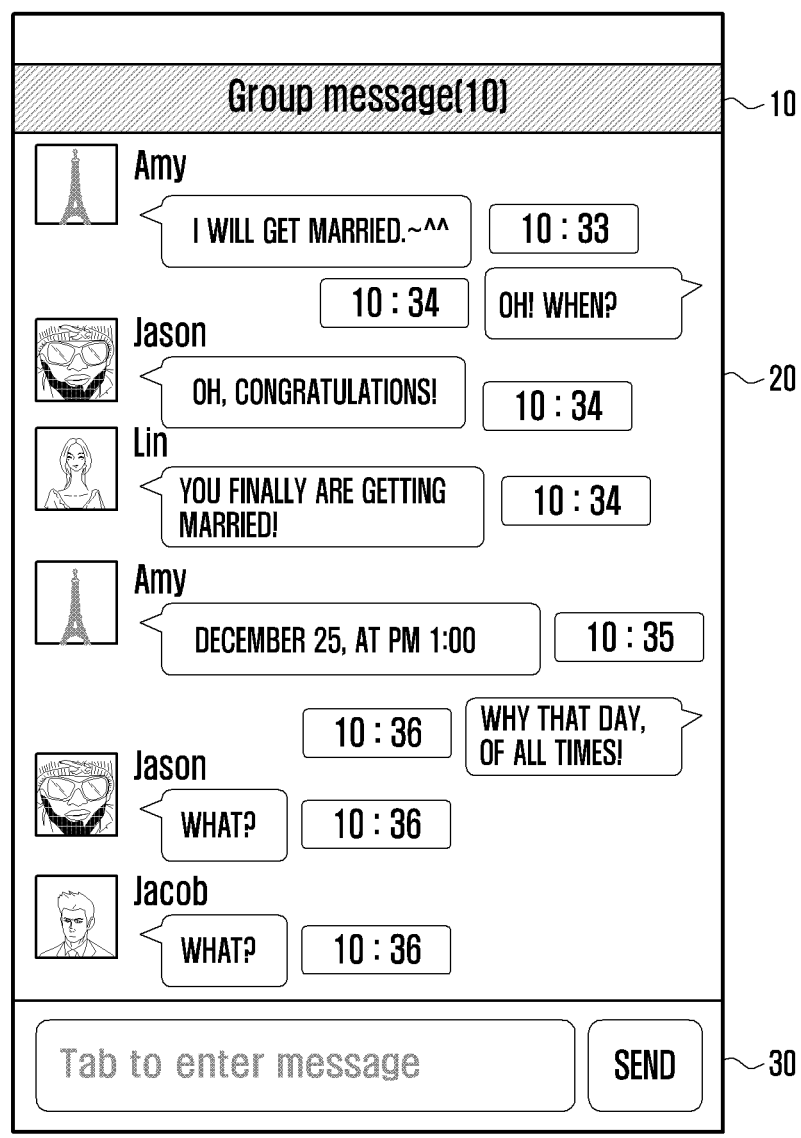
FIG. 3 is a view illustrating an example of a window for group chatting according to an embodiment of the present disclosure.

FIG. 3 is a view illustrating an example of a group chatting window displayed on the display unit according to an embodiment of the present disclosure.

Referring to FIG. 3, the group chatting window includes an information display region 10, a dialog display region 20, and a dialog input region 30. The information display region 10, the dialog display region 20, and the dialog input region 30 may be configurable by a user. The information display region 10 is an area for displaying information of the group chatting, in which information such as a name of a group chatting, the number of conversation partners who participate in the group chatting, and/or the like may be displayed according to a user's setting or a default value. The dialog displaying region 20 is an area for displaying at least one dialog for the group chatting, in which information on a conversation partner who writes the dialog, time when the dialog is transmitted or received, and/or the like. The dialog input region 30 is an area for displaying a user interface for transmitting the dialog, in which a dialog input window in which the user inputs a dialog to be transmitted and a transmission icon are displayed. The dialog input window may display the dialog that the user inputs.

As shown in FIG. 3, the controller 130 controls the display unit 150 to display the dialog of the conversation partner received from the server on the group chatting window, or to display the dialog to be transmitted by the user to the server on the group chatting window, by executing the group chatting.

At operation 220, the controller 130 determines whether a request for extracting a dialog is detected.

The controller 130 may determine whether the request for the extraction of the dialog is detected through the input unit 120. The request for the extraction of the dialog may be a request for extracting a dialog of a certain conversation partner among one or more dialogs constituting the executed group chatting.

The request for the extraction of the dialog may be generated by an input of the user corresponding to the request for the extraction of the dialog. For example, the user input may be any one of a touch input or a proximity input on the user interface corresponding to the request for the extraction of the dialog, or a motion input or a hovering input corresponding to the request for the extraction of the dialog. Further, the request for the extraction of the dialog may be generated by an input of selecting the request for the extraction of the dialog in menu.

Figure 4:
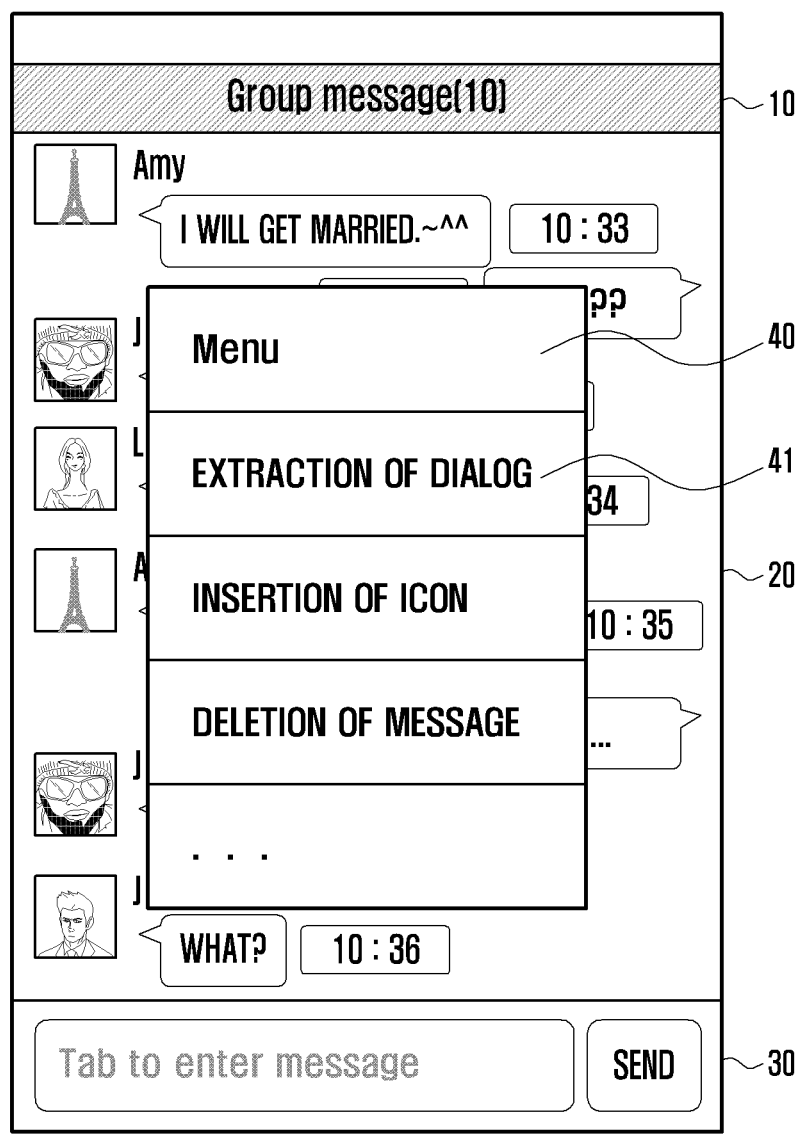
FIG. 4 is a view illustrating an example of a menu requesting an extraction of a dialog according to an embodiment of the present disclosure.

FIG. 4 is a view illustrating an example of a menu requesting an extraction of a dialog according to an embodiment of the present disclosure.

Referring to FIG. 4, particularly, the controller 130 controls the display unit 150 to display a menu 40 for various functions supported by the group chatting according to user's request. The menu 40 may be displayed in the form of an icon, a pop-up window, and/or the like capable of indicating menus. Further, the menu 40 may include, for example, an extraction of a dialog, an insertion of an icon, a deletion of a message, and/or the like. At this time, the request for the extraction of the dialog is executed as the user selects a menu 41 for the extraction of the dialog in the displayed menu 40 through the input unit 120. If selection of the menu 41 for the extraction of the dialog is detected through the input unit 120, the controller 130 determines that the request for the extraction of the dialog is detected.

If the controller 130 determines that the request for the extraction of the dialog is not detected at operation 220, then the controller 130 continues to execute the group chatting in operation 210.

In contrast, if the controller 130 determines that the request for the extraction of the dialog is detected at operation 220, then the controller 130 may proceed to operation 230 at which the controller 130 selects a certain conversation partner.

The controller 130 may automatically select a certain conversation partner according to an input of the user or a predetermined condition if necessary. The certain conversation partner may beat least one conversation partner selected from plural conversation partners included in the group chatting, and may be the conversation partner who the user selects to extract the dialog of the conversation partner.

The selection of the certain conversation partner may be executed by an input of the user. For example, the selection of the certain conversation partner may be executed by an input of selecting at least one of plural conversation partners included in the group chatting.

Figure 5:
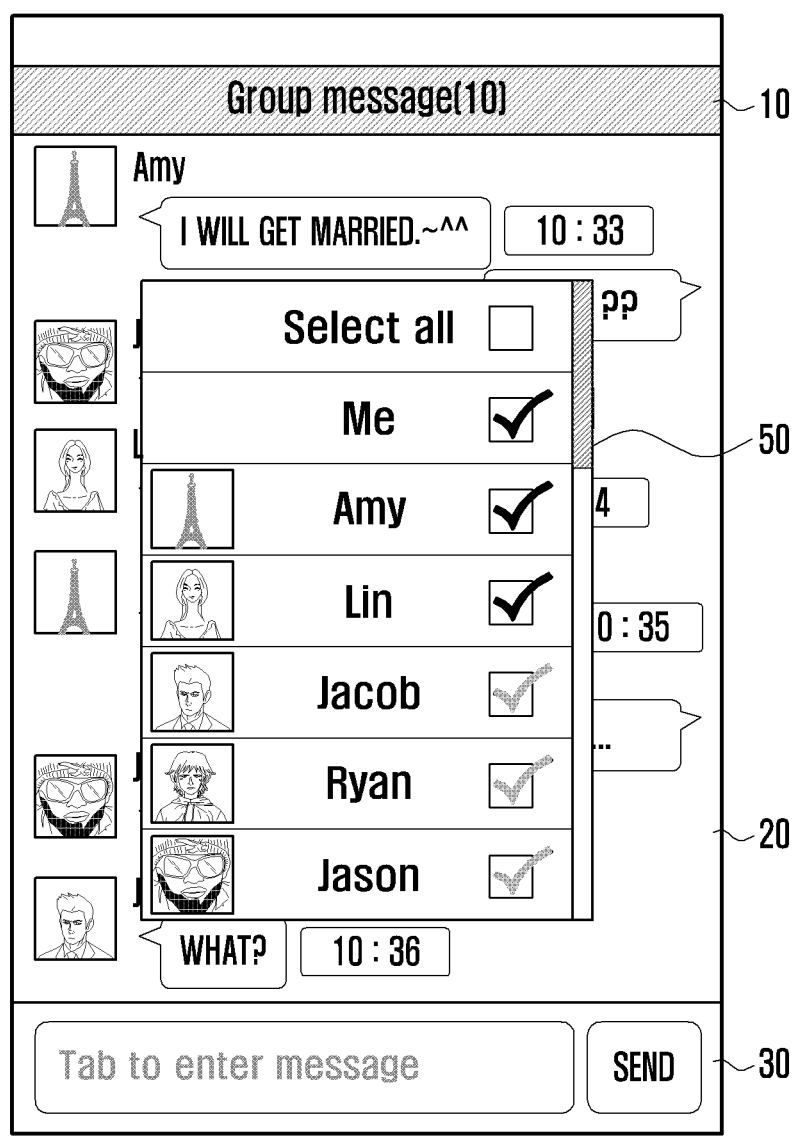
FIG. 5 is a view illustrating an example of a screen for selecting a certain conversation partner according to an embodiment of the present disclosure.

FIG. 5 is a view illustrating an example of a screen for selecting a certain conversation partner according to an embodiment of the present disclosure.

Referring to FIG. 5, the controller 130 controls the display unit 150 to display a conversation partner list 50 for plural conversation partners included in the group chatting according to user's request. The conversation partner list 50 is information for plural conversation partners included in the group chatting, and may indicate names, nicknames, profiles, images, and/or the like of the conversation partners therein. Further, the conversation partner list 50 may include a user interface such as an icon, a check-box, and/or the like to select each conversation partner as a certain conversation partner, and also may include a user interface to select all conversation partners or to release the selection for all conversation partners according to the user's necessity. The selection of a certain conversation partner may be executed as the user selects a certain conversation partner from the conversation partner list 50 through the input unit 120.

If an input of selecting the certain conversation partner is detected through the input unit 120, the controller 130 may select at least one certain conversation partner according to the input. As shown in FIG. 5, for example, if an input in check-boxes for Me, Amy and Lin is detected, the controller 130 may select Me, Amy and Lin as certain conversation partners according to the input.

At operation 240, the controller 130 extracts a dialog of a certain conversation partner selected from dialogs in the group chatting.

The group chatting may include at least one dialog which is sent by plural conversation partners participating in the group chatting. As shown in FIG. 3, the controller 130 controls the display unit 150 to display at least one dialog for the group chatting on a group chatting window. The dialog displayed on the group chatting window may be sent by the plural conversation partners participating in the group chatting. At least one dialog may be temporarily or permanently stored in the storage 140, or in a server providing a chatting function. The storage unit 140 or the server may store information on a conversation partner for each dialog, information on time when the dialog is sent and/or the like along with the dialog.

The controller 130 extracts the dialog of a certain conversation partner selected from one or more dialogs. The controller 130 may extract information on the certain conversation partner from the stored dialog. Alternatively, the controller 130 may transmit a request for an extraction of the dialog of the certain conversation partner to the server through the communication unit 110, and receive the extracted dialog of the certain conversation partner from the server.

For example, during the execution of the group chatting as shown in FIG. 3, if Me, Amy and Lin are selected as the certain conversation partners, as shown in FIG. 5, the controller 130 may extract only dialogs of Me, Amy and Lin from the storage unit 140. Alternatively, the controller may transmit a request for an extraction of the dialogs of Me, Amy and Lin to the server, and receive the dialogs of Me, Amy and Lin from the server.

At operation 250, the controller 130 displays the extracted dialog on the sub-chatting window.

The sub-chatting window 60 is a chatting window for displaying only the dialog of the selected certain conversation partner extracted from one or more dialogs constituting the group chatting.

Figure 6:
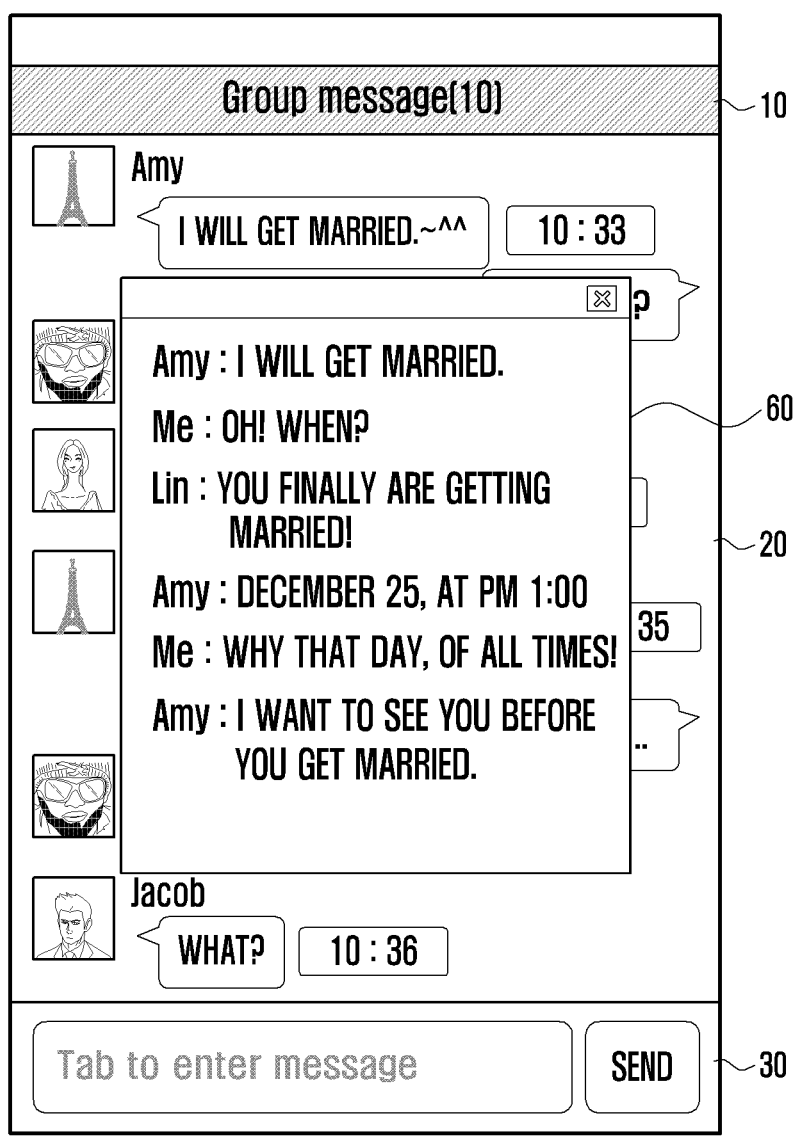
FIG. 6 is a view illustrating an example of extracted dialogs displayed on a sub-chatting window according to an embodiment of the present disclosure.

FIG. 6 is a view illustrating an example of extracted dialogs displayed on a sub-chatting window according to an embodiment of the present disclosure.

Referring to FIG. 6, the sub-chatting window 60 may be displayed along with a group chatting window of the group chatting. The sub-chatting window 60 may be displayed on the display unit 150 according to at least one effect of a pop-up, a screen division, and an overlay, under a control of the controller 130. In FIG. 6, the group chatting window on which the sub-chatting window 60 is displayed according to a pop-up effect is shown as an example.

In the case that Me, Amy and Lin are selected as the certain conversation partners as shown in FIG. 5, the controller 130 may control the display unit 150 to display only the dialogs of Me, Amy and Lin on the sub-chatting window 60, in which the display unit 150 is controlled to display the sub-chatting window 60 on the group chatting window in the form of a pop-up window.

Figure 7:
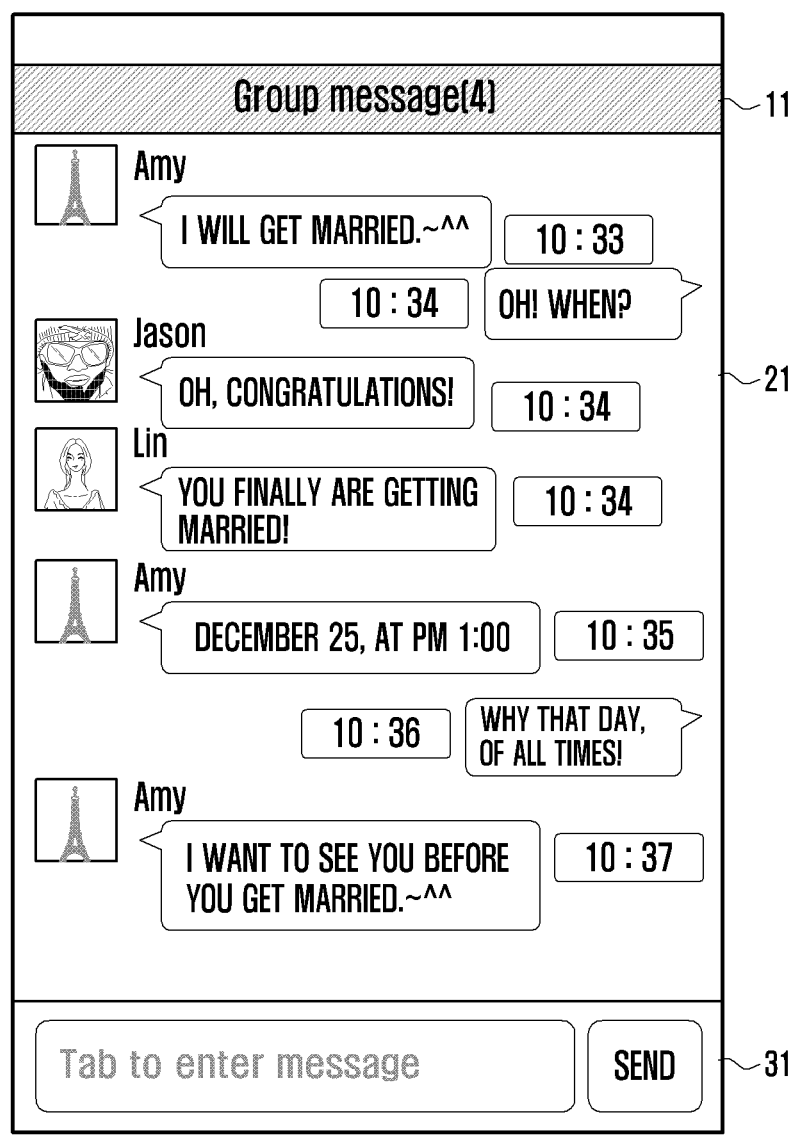
FIG. 7 is a view illustrating an example of extracted dialogs displayed on a sub-chatting window according to an embodiment of the present disclosure.

FIG. 7 is a view illustrating an example of extracted dialogs displayed on a sub-chatting window according to an embodiment of the present disclosure.

Referring to FIG. 7, the sub-chatting window may be formed as a new group chatting window. Particularly, the controller 130 may generate a new group chatting for the selected certain conversation partner. The new group chatting may be generated separately from the group chatting which is currently executed, and may have the name and/or members of the group chatting different from those of the currently executed group chatting. At least one of conversation partners participating in the new group chatting may be selected in order to extract a dialog thereof. The controller 130 controls the display unit 150 to display a group chatting window for the new group chatting. The controller 130 controls the display unit 150 to display an extracted dialog of a certain conversation partner on the group chatting window for the new group chatting. The controller 130 enables the new group chatting window to display an information display region 11, a dialog display region 21, and a dialog input region 31.

As shown in FIG. 5, if Me, Amy and Lin are selected as the certain conversation partners, then the controller 130 may generate a new group chatting in which Me, Amy and Lin participate as the conversation partners. Further, the controller 130 may display the group chatting window for the new group chatting in the form of a sub-chatting window, and control the display unit 150 to display the dialogs of Me, Amy and Lin extracted from the currently executed group chatting on the group chatting window.

According to various embodiments of the present disclosure, the controller 130 may determine whether a sub-chatting window for the selected certain conversation partner is previously present, and may display the extracted dialog on the sub-chatting window if the sub-chatting window is determined to be present.

Figure 8:
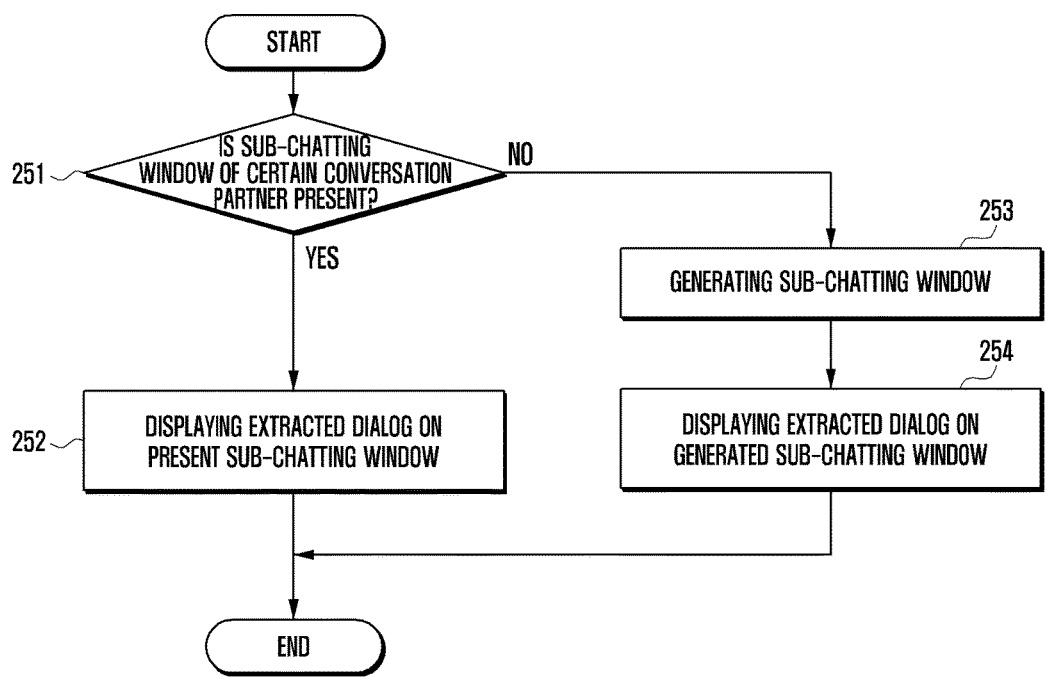
FIG. 8 is a flowchart particularly illustrating a process of displaying an extracted dialog on a sub-chatting window according to an embodiment of the present disclosure.

FIG. 8 is a flowchart particularly illustrating a process of displaying an extracted dialog on a sub-chatting window according to an embodiment of the present disclosure.

Referring to FIG. 8, at operation 251, the controller 130 determines whether the sub-chatting window for the certain conversation partner is present.

If a request for an extraction of the dialog of the certain conversation partner is already generated, then a sub-chatting window on which only the extracted dialog of the certain conversation partner is displayed may be previously present. The controller 130 may determine whether the sub-chatting window for the selected certain conversation partner is previously present. If the sub-chatting window forms a new group chatting window, then the controller 130 may determine whether a group chatting window on which a certain conversation partner participating in the group chatting as a conversation partner is displayed is present.

If the controller 130 determines that the sub-chatting window is present at operation 251, then the controller 130 may proceed to operation 252 at which the controller 130 may display the extracted dialog on the present sub-chatting window. The controller 130 may display a newly extracted dialog on the sub-chatting window which is previously present. The controller 130 may display the newly extracted dialog along with the previously extracted and displayed dialog. Alternatively, the controller 130 may delete the previously extracted and displayed dialog and display only the newly extracted dialog.

In contrast, if the controller 130 determines that the sub-chatting window is not present at operation 251, then the controller 130 may proceed to operation 253 at which the controller 130 may generate a sub-chatting window. The controller 130 may generate the sub-chatting window as a new group chatting window.

Thereafter, at operation 254, the controller 130 may display the extracted dialog on the generated sub-chatting window.

Hereinafter, an operation of the controller 130 if a dialog transmission or reception event is additionally detected when the extracted dialog is displayed on the sub-chatting window will be described in detail.

Figure 9:
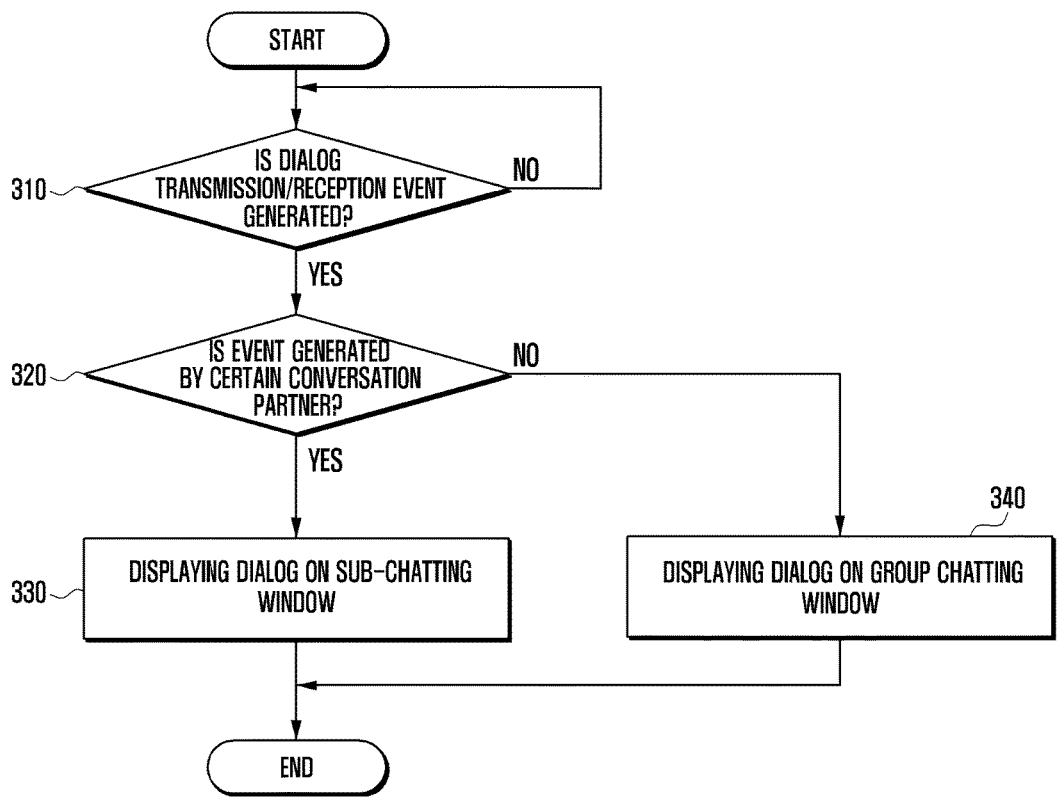
FIG. 9 is a flowchart particularly illustrating a process of displaying transmitted and received dialogs on a sub-chatting window according to an embodiment of the present disclosure.

FIG. 9 is a flowchart particularly illustrating a process of displaying transmitted and received dialogs on a sub-chatting window according to an embodiment of the present disclosure.

Referring to FIG. 9, at operation 310, the controller 130 determines whether a dialog transmission or reception event is detected.

The controller 130 may determine whether the dialog transmission event is detected by the input unit 120. The dialog transmission event may be generated by an input of a user. For example, the dialog transmission event may be generated by an input of a dialog and an input of transmitting the dialog. The inputs may be detected through the dialog input region 30 of the group chatting window shown in FIG. 3.

The controller 130 may determine whether the dialog reception event is detected by the communication unit 110. The dialog reception event may be generated as the dialog is received through the communication unit 110 from the server. As receiving a data packet including a dialog for an execution of the chatting, the communication unit 110 may transmit the data packet to the controller 130. The controller 130 which receives the data packet may determine that the dialog reception event is generated as a result of analyzing the data packet. The data packet may include a dialog, information on a conversation partner generating the conversation reception event, and information on time when the dialog is received.

If the controller 130 determines that the dialog transmission or reception event is detected at operation 310, then the controller 130 may proceed to operation 320 at which the controller 130 may determine whether a certain conversation partner generates the event.

If the user of the portable device 100 is included among certain conversation partners who are selected to extract the user's dialog, because the dialog transmission event is generated by the user, then the controller 130 may determine that the event is generated by the certain conversation partner.

If the dialog reception event is generated, then the controller 130 may determine whether the dialog reception event is generated by the selected certain conversation partner, based on the information on the conversation partner involved in the received data packet.

If the controller 130 determines that the event is generated by the certain conversation partner at operation 320, then the controller 130 may proceed to operation 330 at which the controller 130 may display the dialog on the sub-chatting window.

If the dialog transmission event is determined to be generated by the certain conversation partner, then the controller 130 may control the display unit 150 to display the dialog of the certain conversation partner, which is transmitted and received by the event, on the sub-chatting window. If the sub-chatting window is previously present, then the controller 130 may additionally display the dialog transmitted and received by the event on the displayed sub-chatting window.

Figure 10:
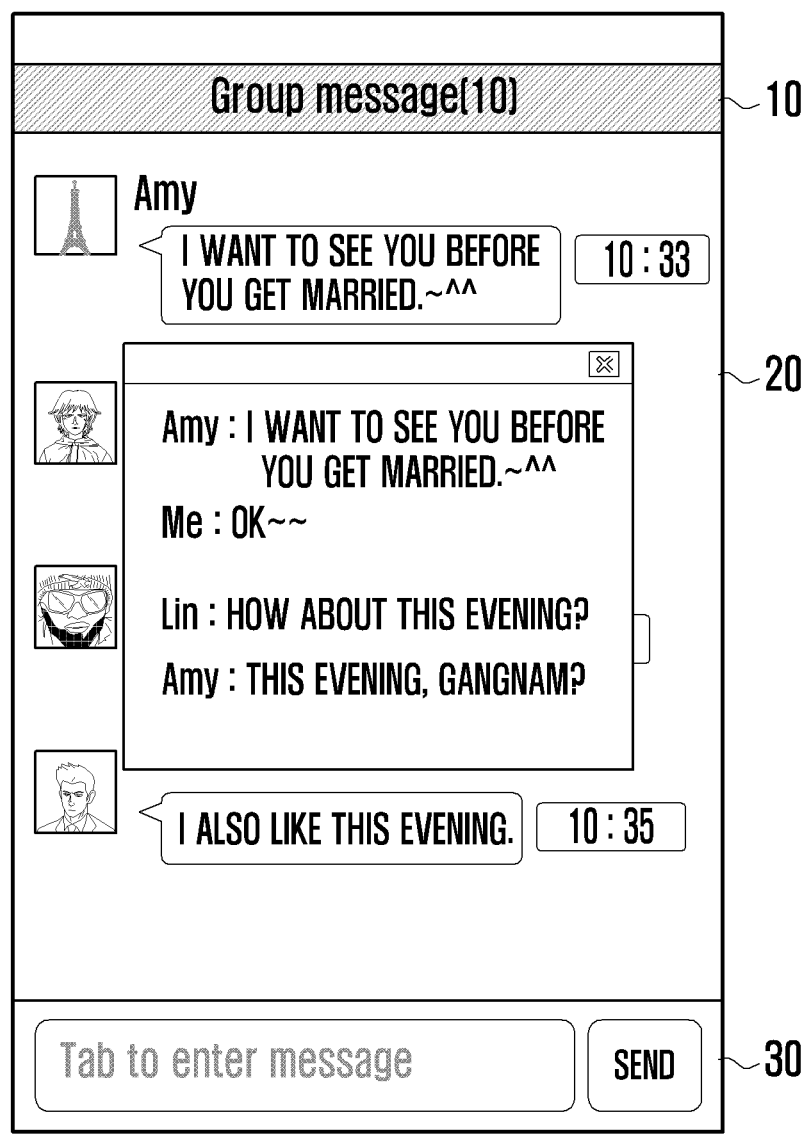
FIG. 10 is a view illustrating an example of transmitted and received dialogs displayed on a sub-chatting window according to an embodiment of the present disclosure.

FIG. 10 is a view illustrating an example of transmitted and received dialogs displayed on a sub-chatting window according to an embodiment of the present disclosure.

Referring to FIG. 10, if a dialog transmission and reception event is generated by any one conversation partner of selected Me, Amy and Lin in the embodiment of FIG. 5, then the controller 130 may display a dialog, which is transmitted or received by an event, on the sub-chatting window. As shown in FIG. 6, for example, if a dialog of "at Gangnam, this evening today?" is received from Amy after the dialog of Me, Amy and Lin is extracted and displayed on the sub-chatting window, the controller 130 controls the display unit 150 to display the dialog received from Amy on the sub-chatting window.

The controller 130 may display the transmitted or received dialog on the group chatting window at the same time as the controller 130 displays the transmitted or received dialog on the sub-chatting window. In this case, the sub-chatting window may perform a function of extracting and displaying a dialog of a certain conversation partner during the group chatting. In contrast, the controller 130 may display a transmitted or received dialog only on the sub-chatting window. If the sub-chatting window is formed of a new group chatting window, then the controller 130 may display the transmitted or received dialog only on the new group chatting window. In this case, the new group chatting window may operate as a secret chatting window.

If the controller 130 determines that the event is not generated by the certain conversation partner at operation 320, then the controller 130 may proceed to operation 340 at which the controller 130 may display the dialog on the group chatting window.

If the event is not generated by the certain conversation partner, because the dialog of the event is not a dialog to be extracted or a dialog for a secret chatting, then the controller 130 may display the dialog of the event on the group chatting window.

Hereinafter, an embodiment of the present disclosure in which a secret conversation is achieved in the sub-chatting window in the case that a dialog transmission or reception event is additionally detected when the extracted dialog is displayed on the sub-chatting window will be described.

Figure 11:
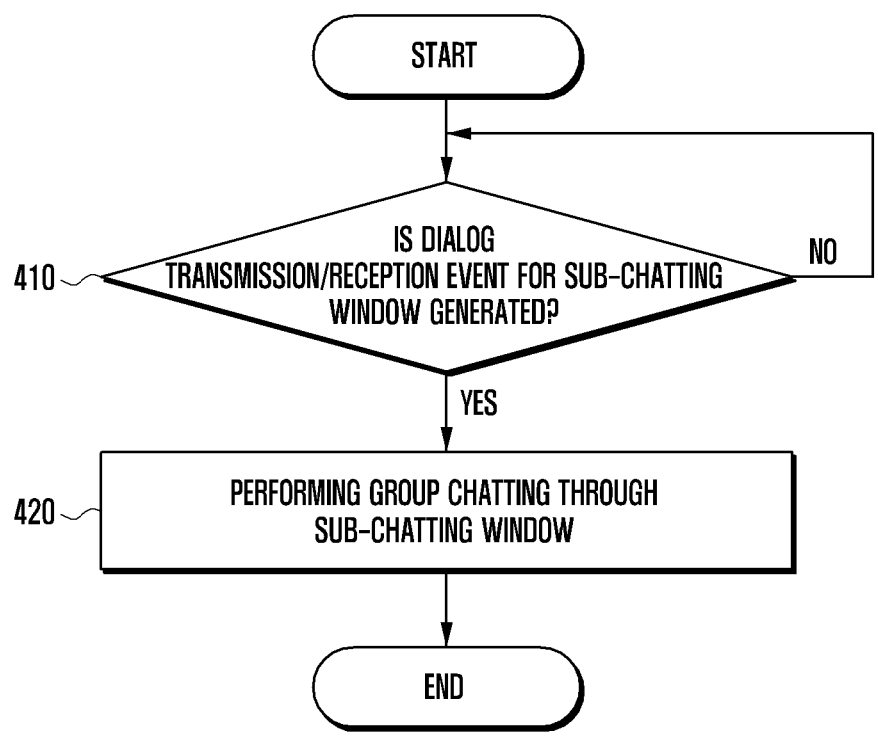
FIG. 11 is a flowchart illustrating a process of performing secret conversation through a sub-chatting window according to an embodiment of the present disclosure.
Figure 12:
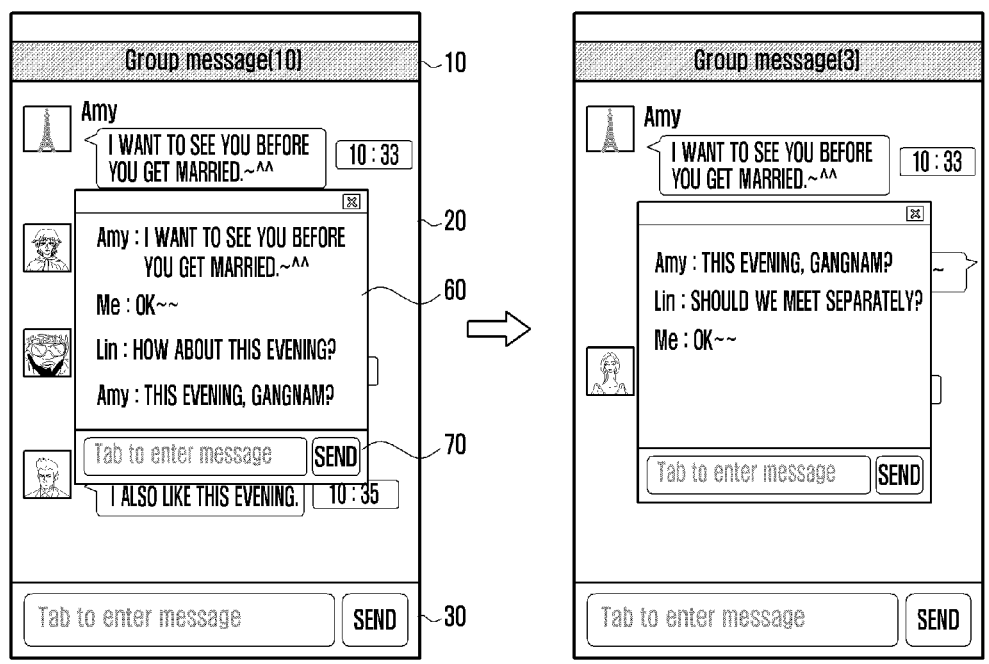
FIG. 12 is a view illustrating an example of a process of performing a secret conversation according to an embodiment of the present disclosure.

FIG. 11 is a flowchart illustrating a process of performing secret conversation through a sub-chatting window according to an embodiment of the present disclosure. FIG. 12 is a view illustrating an example of a process of performing a secret conversation according to an embodiment of the present disclosure.

Referring to FIG. 11, a dialog of a certain conversation partner is extracted and displayed on the sub-chatting window. Referring to FIG. 12, the displayed sub-chatting window may be displayed to include a dialog input region 70, similarly to the group chatting window.

At operation 410, the controller 130 determines whether a dialog transmission or reception event for the sub-chatting window is generated in the state in which the sub-chatting window is displayed.

The controller 130 may determine whether the dialog transmission event is detected by the input unit 120. The dialog transmission event may be generated by an input of a user. For example, the dialog transmission event may be generated by an input of a dialog and an input of transmitting the dialog through the dialog input region 70 of the sub-chatting window shown in FIG. 12.

The controller 130 may determine whether the dialog reception event is detected by the communication unit 110. The dialog reception event may be generated as the dialog is received through the communication unit 110 from the server. As receiving a data packet including a dialog for an execution of the chatting, the communication unit 110 may transmit the data packet to the controller 130. The controller 130 which receives the data packet may determine that the dialog reception event is generated as a result of analyzing the data packet. The data packet may include a dialog, information on a conversation partner generating the dialog reception event, and information on time when the dialog is received.

The controller 130 may determine whether the received dialog is generated for the sub-chatting window, based on the information on the conversation partner of the data packet received through the communication unit 110. For example, if the information on the conversation partner is information on a certain conversation partner included in the sub-chatting window, then the controller 130 may determine that the received dialog is generated for the sub-chatting window.

If the controller 130 determines that the dialog transmission or reception event is detected at operation 410, then the controller 130 may proceed to operation 420 at which the controller 130 performs the group chatting through the sub-chatting window.

As shown in FIG. 12, the controller 130 displays only the transmitted/received dialog on the sub-chatting window, and enables the dialog to be transmitted and received to/from only a terminal of a certain conversation partner included in the sub-chatting window, thereby performing the group chatting through the sub-chatting window. The controller 130 controls the group chatting window not to display a corresponding dialog. Further, the controller 130 controls the corresponding dialog not to be transmitted and received to/from the conversation partner who is included not in the sub-chatting window but only in the group chatting window. Thereby, the controller 130 may provide a function in which the certain conversation partners included in the sub-chatting window have a closed conversation with one another in a secret chatting mode.

Referring to FIG. 12, if a dialog transmission and reception event is generated through the sub-chatting window by any one conversation partner of selected Me, Amy and Lin in the embodiment of the present disclosure illustrated in FIG. 5, then the controller 130 may display a dialog not on the group chatting window but only on the sub-chatting window. Further, the controller 130 transmits and receives the dialog to/from only the certain conversation partner displayed on the sub-chatting window, and does not transmit and receive the dialog to/from the remaining group chatting conversation partners who are not displayed on the sub-chatting window. Accordingly, if Me, Amy and Lin additionally generate a dialog transmission/reception event for the sub-chatting window, the dialog is displayed only on the sub-chatting window as shown in FIG. 12.

Hereinafter, a detailed embodiment of the present disclosure with relation to the operation of the controller 130 in the case that a certain conversation partner whose a dialog is extracted is added will be described.

Figure 13:
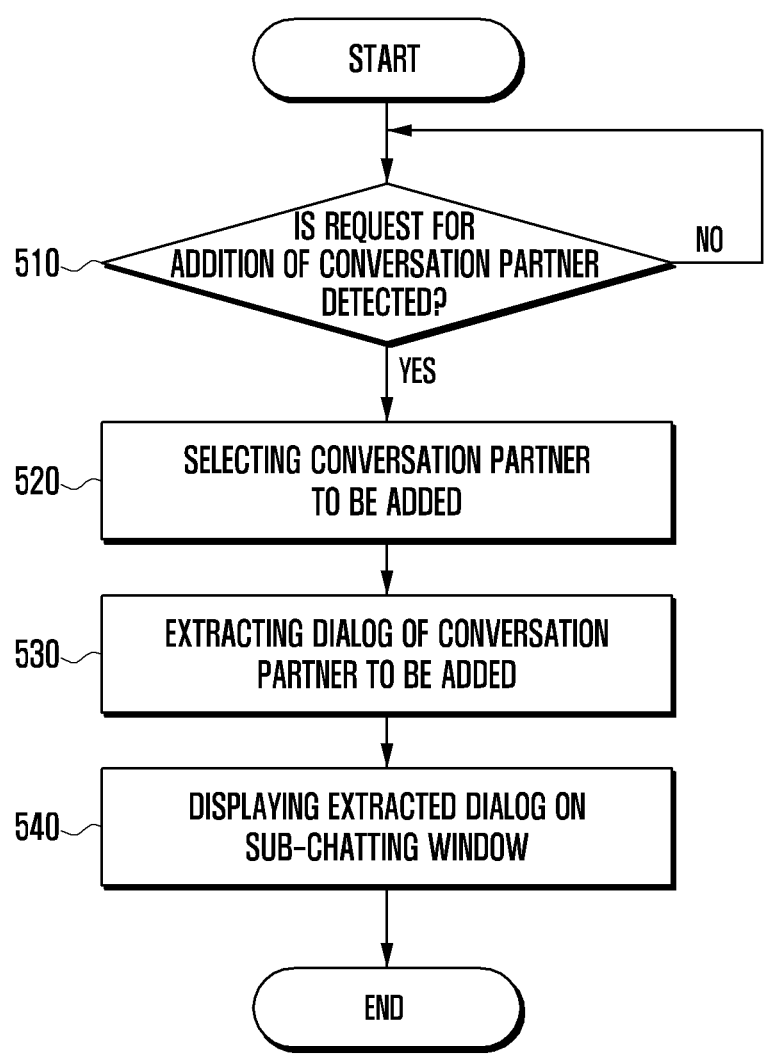
FIG. 13 is a flowchart particularly illustrating a process of adding a certain conversation partner to group chatting according to an embodiment of the present disclosure.

FIG. 13 is a flowchart particularly illustrating a process of adding a certain conversation partner to group chatting according to an embodiment of the present disclosure.

Referring to FIG. 13, at operation 510, the controller 130 determines whether a request for an addition of a certain conversation partner is detected.

The request for the addition of the certain conversation partner may be generated by an input of the user corresponding to the request for the addition of the certain conversation partner. For example, the user's input may be any one of a touch input or a proximity input on the user interface corresponding to the request for the addition of the certain conversation partner, or a motion input or a hovering input corresponding to the request for the addition of the certain conversation partner. The request for the addition of the certain conversation partner may be generated by a drag and drop input. For example, the request for the certain conversation partner may be an input of dragging and dropping a certain conversation partner to be added, from a chatting window in which a chatting is currently performed or a list of conversation partners capable of chatting to the sub-chatting window.

Figure 14:
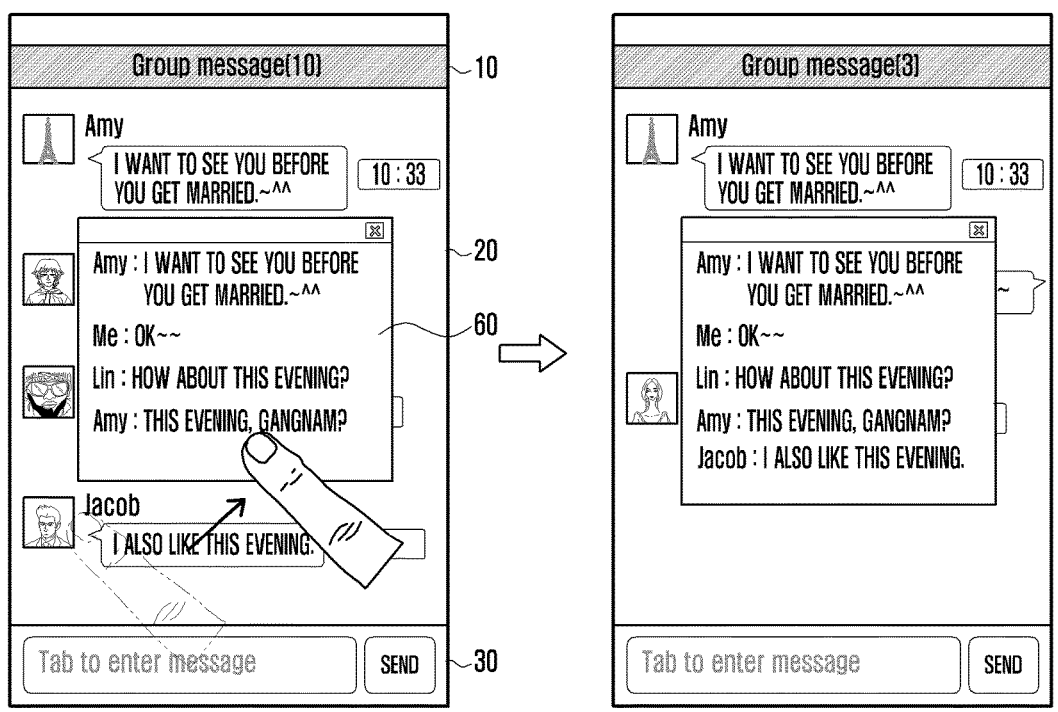
FIG. 14 is a view illustrating an example of a process of adding a certain conversation partner to group chatting according to an embodiment of the present disclosure.

FIG. 14 is a view illustrating an example of a process of adding a certain conversation partner to group chatting according to an embodiment of the present disclosure.

Referring to FIG. 14, the sub-chatting window 60 may be displayed in the form of a pop-up window on a group chatting window. At this time, the request for the addition of the certain conversation partner may be an input of dragging and dropping at least one of a profile, a name, an image, a dialog, and/or the like of the certain conversation partner to be added, from the group chatting window to the sub-chatting window 60. The request for the addition of the certain conversation partner may be generated for two or more conversation partners.

If the controller 130 determines that the request for the addition of the certain conversation partner is not detected at operation 510, then the controller 130 may continue to poll for a request for the addition of the certain conversation partner.

If the controller 130 determines that the request for the addition of the certain conversation partner is detected at operation 510, then the controller 130 proceeds to operation 520 at which the controller 130 selects a conversation partner to be added.

The controller 130 may select the conversation partner to be added in correspondence to the request for the addition of the certain conversation partner. The controller 130 may control the display unit 150 to display a list 50 of the conversation partners as shown in FIG. 5, in order to receive an input of selecting a conversation partner to be added. If the input of selecting the conversation partner, whom the user wants to add, from the list 50 of the conversation partners, is detected, then the controller 130 may select the conversation partner to be added in response to the input.

If the request for the addition of the certain conversation partner is a drag and drop input as shown in FIG. 14, then the controller 130 determines and selects the conversation partner to be added, based on the drag and drop input. Referring to FIG. 14, as an input of dragging and dropping Jacob in the sub-chatting window 60 is detected, the controller 130 may select Jacob as the conversation partner to be added.

At operation 530, the controller 130 extracts a dialog of the conversation partner to be added.

The controller 130 extracts the dialog of the conversation partner to be added, from the currently performed group chatting.

If dialog information is stored in the storage unit 140, then the controller 130 may extract the dialog corresponding to the conversation partner to be added from the storage unit 140. Alternatively, the controller 130 may transmit a request for an extraction of the dialog of the certain conversation partner to be added to the server through the communication unit 110, and receive the extracted dialog of the certain conversation partner to be added from the server.

Referring to FIG. 14, the controller 130 may extract "What?" and "I also like this evening" which are dialogs of Jacob from the group chatting.

At operation 540, the controller 130 displays the extracted dialog on the sub-chatting window.

The controller 130 controls the display unit 150 to display the extracted dialog of the conversation partner to be added on the sub-chatting window.

The sub-chatting window may be formed as a chatting window displayed on the group chatting window as shown in FIG. 6, or as a new group chatting window as shown in FIG. 7. The sub-chatting window may be displayed on the display unit 150 according to at least one effect of a pop-up, a screen division, and an overlay, under a control of the controller 130.

As shown in FIG. 14, if Jacob is selected as the conversation partner to be added, the controller 130 may control the display unit 150 to additionally display the dialog of Jacob on the sub-chatting window 60.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling a group chat, the method comprising:
controlling, by a controller, a display unit to display a group chatting window for the group chat, if a request of a user of a portable device for the group chat is detected through an input unit;
detecting, by the controller, a request for an extraction of a dialog for at least one certain conversation partner of conversation partners in the group chat;
if the request for the extraction of the dialog is detected, extracting, by the controller, the dialog of the at least one certain conversation partner from one or more dialogs in the group chat; and
controlling, by the controller, the display unit to display the extracted dialog on a sub-chatting window,
wherein the controller extracts automatically the dialog of the at least one certain conversation partner during the group chatting, and controls the display unit to display the dialog on the sub-chatting window.

2. The method of claim 1, wherein the detecting of the request for the extraction of the dialog comprises:
selecting the certain conversation partner according to a user input.

3. The method of claim 1, wherein the sub-chatting window is displayed according to at least one effect of a pop-up, a screen division, and an overlay.

4. The method of claim 1, wherein the displaying of the extracted dialog on the sub-chatting window comprises:
determining whether the sub-chatting window for the certain conversation partner exists;
displaying the extracted dialog on the present sub-chatting window if the sub-chatting window for the certain conversation partner is determined to exist; and
generating the sub-chatting window if the sub-chatting window for the certain conversation partner is determined not to exist.

5. The method of claim 1, wherein the displaying of the extracted dialog on the sub-chatting window comprises:
generating a new group chat for the certain conversation partner; and
displaying the extracted dialog on a group chatting window for the group chat.

6. The method of claim 5, wherein the generating of the group chat comprises:
determining whether a group chat for the certain conversation partner exists; and
generating the group chat for the certain conversation partner if the group chat is determined not to exist.

7. The method of claim 1, further comprising:
detecting a dialog transmission or reception event for the group chat;
determining whether the event is generated by the certain conversation partner; and
in response to the event being generated by the certain conversation partner, displaying a dialog which is transmitted or received by the event on the sub-chatting window.

8. The method of claim 1, further comprising:
detecting a dialog transmission or reception event generated by the certain conversation partner included in the sub-chatting window; and
performing the group chat by using the transmitted or received dialog for the certain conversation partner in the sub-chatting window.

9. The method of claim 1, further comprising:
selecting a certain conversation partner to be added if a request for an addition of the certain conversation partner is detected;
extracting a dialog of the certain conversation partner to be added; and
displaying the extracted dialog of the certain conversation partner to be added on the sub-chatting window.

10. The method of claim 9, wherein the request for the addition of the certain conversation partner corresponds to an input of dragging and dropping the certain conversation partner to be added in the sub-chatting window.

11. A portable device comprising:
a communication unit configured to communicate at least one dialog for a group chat with a server;
a display unit;
an input unit; and
a controller configured to:
control the display unit to display a group chatting window for the group chat, if a request of a user of the portable device for the group chat is detected,
detect a request for an extraction of a dialog for at least one certain conversation partner of conversation partners in the group chat,
extract the dialog of the at least one certain conversation partner from one or more dialogs if the request for the extraction of the dialog is detected through the input unit, and control the display unit to display the extracted dialog on a sub-chatting window, wherein the controller extracts automatically the dialog of the at least one certain conversation partner during the group chatting, and controls the display unit to display the dialog on the sub-chatting window.

12. The portable device of claim 11, wherein the controller receives an input of selecting the certain conversation partner through the input unit.

13. The portable device of claim 11, wherein the controller controls the display unit to display the sub-chatting window according to at least one effect of a pop-up, a screen division, and an overlay.

14. The portable device of claim 11, wherein the controller determines whether the sub-chatting window for the certain conversation partner exists, controls the display unit to display the extracted dialog on the present sub-chatting window if the sub-chatting window for the certain conversation partner is determined to exist, and generates the sub-chatting window if the sub-chatting window for the certain conversation partner is determined not to exist.

15. The portable device of claim 11, wherein the controller generates a new group chat for the certain conversation partner, and controls the display unit to display the extracted dialog on a group chatting window for the group chat.

16. The portable device of claim 15, wherein the controller determines whether the group chatting for the certain conversation partner is determined to exist, and generates the group chat for the certain conversation partner if the group chat is determined not to exist.

17. The portable device of claim 11, wherein the controller determines whether the event is generated by the certain conversation partner if a dialog transmission or reception event for the group chatting is detected, and controls the display unit to display a transmitted or received dialog by the event in response to the event being generated by the certain conversation partner.

18. The portable device of claim 11, wherein the controller receives an input of adding a certain conversation partner through the input unit if a request for an addition of the certain conversation partner is detected through the input unit, extracts a dialog of the certain conversation partner to be added, and controls the display unit to display the extracted dialog of the certain conversation partner to be added on the sub-chatting window.

19. The portable device of claim 18, wherein the request for the addition of the certain conversation partner corresponds to an input of dragging and dropping the certain conversation partner to be added in the sub-chatting window.

20. The portable device of claim 11, wherein the controller performs the group chat for the certain conversation partner in the sub-chatting window by using the transmitted or received dialog if a dialog transmission or reception event by the certain conversation partner included in the sub-chatting window is detected.

* * * * *